Nov. 25, 1952     A. DITTING     2,619,142
BLADE AND BLADE GUARD FOR SLICING MACHINES
USED FOR SLICING MEAT AND SAUSAGE
Filed May 23, 1949
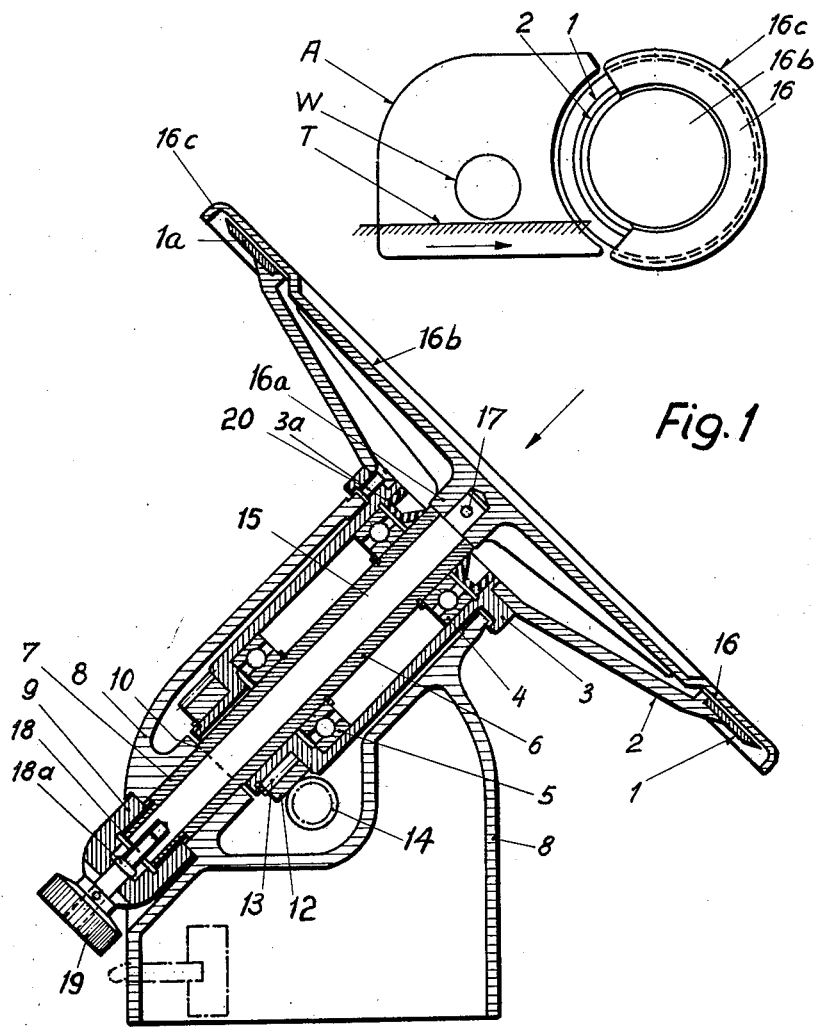
Inventor
Adolf Ditting
by Moore & Hall
attys.

Patented Nov. 25, 1952

2,619,142

UNITED STATES PATENT OFFICE 2,619,142

BLADE AND BLADE GUARD FOR SLICING MACHINES USED FOR SLICING MEAT AND SAUSAGE

Adolf Ditting, Zurich, Switzerland

Application May 23, 1949, Serial No. 94,882
In Switzerland May 24, 1948

4 Claims. (Cl. 146—102)

The present invention relates to a blade and a blade-guard for slicing machines used for slicing meat and sausage.

On the known machines of this type the blade is constituted by a flat disk like a circular saw. There are also annular blades which are screwed on to a blade-holder. Both these types of blades are made fast by means of screws which give rise to unevenness on the side of the blade that touches the meat or sausage, in which fragments of meat are deposited. These cannot be altogether removed and therefore constitute breeding places for germs. Furthermore, annular blades which are screwed on to a blade-holder must be relatively thick if they are to be fastened securely. The blade must be protected by a guard which covers it in part and must be easily removable when the machine is to be cleaned.

The present invention consists in that the blade is constituted by a flat ring shrunk on to a blade-holder the material of which is rendered compact by pressure in the zone of contact with the blade, and further in that the blade-holder is detachably connected with a bush supported by a hollow pillar bolt and has a recess in which engages a part of the blade-guard which is non-rotatably fastened to a rod fitted in the said hollow pillar bolt and is so shaped that the outer face of that part of the blade-guard which engages in the recess of the blade-holder so covers the said recess that the side of the blade facing the meat and the said outer face of the guard form a smooth surface.

The accompanying drawing illustrates one embodiment of the object of the invention by way of example.

Fig. 1 shows the drive and the arrangement of the blade in longitudinal section, Fig. 2 is a top view in the direction of the arrow in Fig. 1, on a reduced scale.

The blade is constituted by a flat ring 1 shrunk on to the blade-holder 2 which has a recess inside the circumference of the blade. To avoid all spaces or unevennesses on the side of the blade facing the meat and to render compact the material of the blade-holder in the zone of contact with the blade, that part of the blade-holder is subjected to pressure, after which the aggregate constituted by the blade and the blade-holder is ground so that the meat is faced with an absolutely smooth surface. The blade-holder 2 is screwed on to the bush 3 so as to form a unit, the bush 3 with the ball-bearings 4 and 5 being supported by the hollow pillar bolt 6. The stepped lower end 7 of the latter is inserted in a hole in the frame 8 of the machine and screwed into a nut 9 so that the pillar bolt 6 is held fast against the eye 10 of the frame 8. A worm wheel 12 is keyed on the bush 3 with the key 13 and meshes with the endless screw 14 which is driven by a motor not shown in the drawing. In the hollow in the pillar bolt 6 is fitted the rod 15 on which the blade-guard 16 is attached by means of the eye 16a and the pin 17. In the lower end of the rod 15 is screwed the screw 18 which is supported by the nut 9 and has a knurled head 19 which presses on the nut 9 so that the eye 16a of the blade-guard 16 is pressed against the free end of the pillar bolt 6. The screw 18 is moored by its collar 18a and its head 19 in the nut 9 in such a way that no axial displacement is possible and therefore it is irremovably fixed to the frame. The rim 16c of the blade-guard covers that part of the blade which is not used for slicing. The blade-guard is stepped in its central part which covers the recess in the blade-holder in such a way that the side 1a of the blade and the face 16b of the guard form a plane.

When the blade has to be cleaned or replaced all that is necessary is to turn the screw 18. This pushes the rod 15 out of the hollow pillar bolt 6, so that the said rod, and with it the blade-guard 16, can be removed from the pillar bolt 6, laying bare the blade and the blade-holder, which can be separated from the bush 3 by unscrewing the screws 3a. Thanks to the screw 19, which is irremovable and therefore cannot get lost, no tools are necessary for removing the blade-guard. A rubber washer 20 is fitted in order to prevent cleaning fluids from seeping into the ball-bearing 4.

The shape of the blade-guard 16 can be seen clearly in Fig. 2. The shield A determines, by its distance from the blade, the thickness of the slices to be cut. The table T carries the meat or sausage W which is conveyed to the blade in the direction of the arrow.

I claim:

1. A slicing machine for the slicing of meats and similar articles comprising a blade holder, a flat annular blade disposed about the periphery of said blade holder, the forward surface presented by said blade and blade holder being a planar, unbroken configuration, a supporting member affixed to said blade holder and coaxial with the axis of rotation of said blade holder, said supporting member rotating with said blade holder, a non-rotatable hollow pillar bolt within said supporting member and coaxial therewith, a rod within said hollow pillar bolt and extending throughout the length thereof, a blade guard fixedly attached to the end of said rod adjacent said blade holder, said blade guard comprising a circular center section in the same plane as the forward surface of said blade and blade holder and a rim integral with said center section but displaced to cover a portion of said blade, and fastening means irremovably mounted upon said slicing machine adjacent the other end of said rod, said fastening means holding said rod within said pillar bolt and releasing said rod to permit the blade guard and rod to be removed from said slicing machine.

2. The apparatus of claim 1 in which said fastening means comprises a screw member rotatably fixed upon said slicing machine, said rod having a threaded bore receiving the threaded portion of said screw member.

3. The apparatus of claim 2 in which said rod is affixed to said blade guard by a pin, said rod fitting within a bored section integrally formed with the center section of said blade guard, the walls of said bored section seating firmly upon one extremity of said pillar bolt when said screw member is tightened within the threaded bore of said rod.

4. The apparatus of claim 1 in which said flat annular blade is shrunk on to said blade holder, the material of which is rendered compact by pressure in the zone of contact with said blade.

ADOLF DITTING.

REFERENCES CITED

The following references are of record in the file of this patent:

UNITED STATES PATENTS

| Number | Name | Date |
|---|---|---|
| 942,081 | Kinyon | Dec. 7, 1909 |
| 1,543,343 | Sivertsen | June 23, 1925 |
| 1,893,905 | Porter | Jan. 10, 1933 |

FOREIGN PATENTS

| Number | Country | Date |
|---|---|---|
| 583,145 | Great Britain | Jan. 31, 1946 |